INVENTOR.
RICHARD T. LOEWE
BY
Harold J. Downes
ATTORNEY

May 8, 1962 R. T. LOEWE 3,034,101

DEVICE FOR PROVIDING INPUTS TO A DIGITAL COMPUTER

Filed Aug. 8, 1956 2 Sheets-Sheet 2

INVENTOR.
RICHARD T. LOEWE

BY Harold J. Donne

ATTORNEY

United States Patent Office 3,034,101
Patented May 8, 1962

3,034,101

DEVICE FOR PROVIDING INPUTS TO A DIGITAL COMPUTER

Richard T. Loewe, Whittier, Calif., assignor to North American Aviation, Inc.
Filed Aug. 8, 1956, Ser. No. 602,766
2 Claims. (Cl. 340—172.5)

Figure 1:
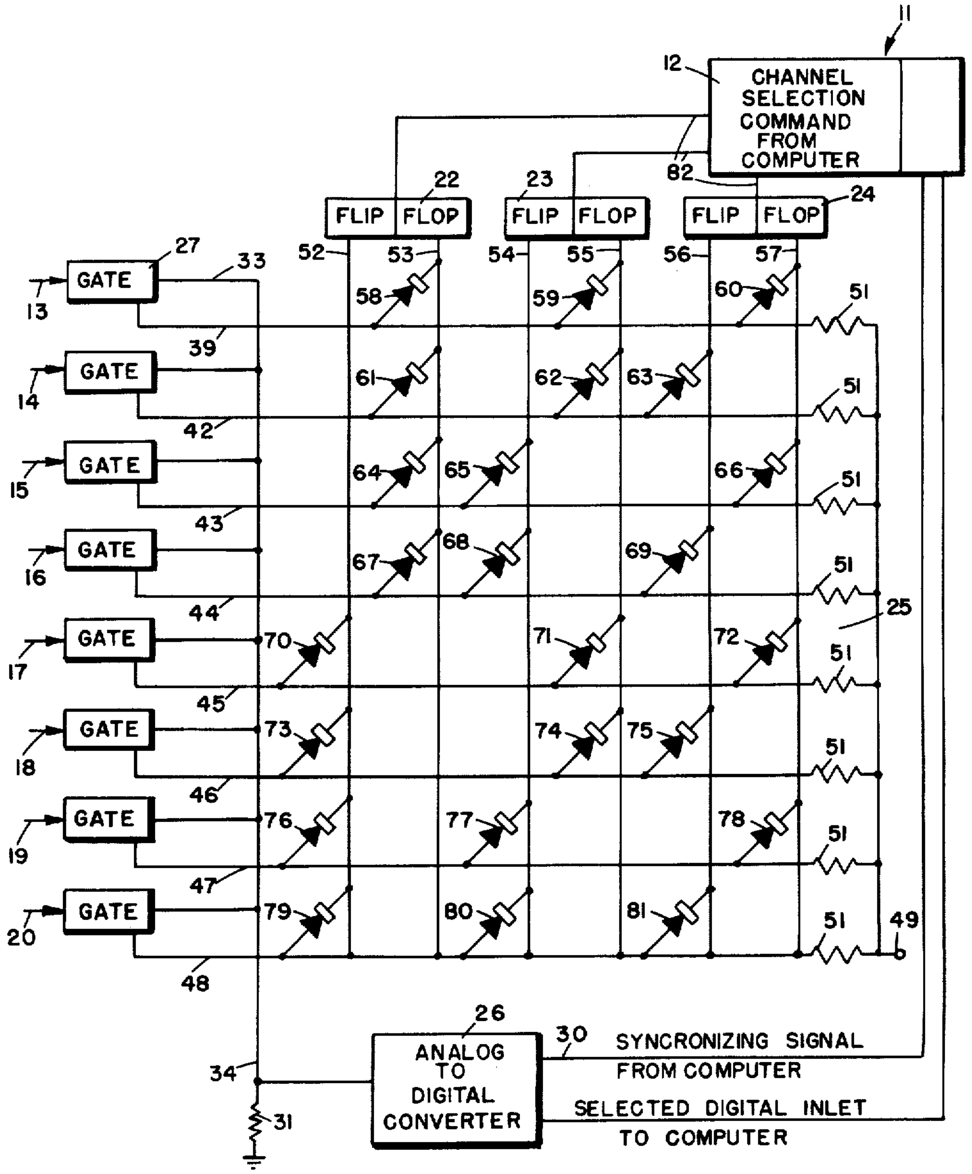

This invention relates generally to methods and apparatus for handling information or data particularly as used in electrical or electronic controls, data processing and computing. It concerns particularly arrangements for selecting a particular electrical analog signal from a multiplicity of electrical analog signals and supplying it to a digital type of data processor, handler, or computer.

In the art of servomechanisms and mechanical or electrical computing devices, the data processing or handling apparatus is ordinarily designed for handling input quantities in either analog or digital form. For some operations, it is more convenient to use a digital computer or counter and for others an analog computer, and converters are utilized for converting from one type of input to another.

The present invention is concerned with achieving improved selective presentation of one of several continuously varying quantities or analog inputs to a digital computer or digital type of data processor or data handler.

The invention is of particular value in cases where a digital computer is used in one or more control loops. The inputs in most control loops originate in analog form. Since the various analog inputs in such equipment are normally scanned in a fixed periodic sequence, a variable time delay is introduced depending on what phase of the scanning sequence is present at the time a particular input is desired. If a magnetic drum or disk or the like is used as a memory for such a computer, the access time for such a memory will run from about 1 to 15 milliseconds, introducing another variable time delay in the control loop. The elimination of both such variable time delays is an object of the invention.

An object of the invention according is to eliminate the necessity for storing each or any of the inputs in the memory device of a computer, to eliminate need for access to a memory device and to eliminate need for periodical sampling from a memory device.

A specific object of the invention is to avoid variable delays in the handling of data in high speed data processing, such as result from periodical sampling and memory access time.

Still another object is to avoid waste of memory space for storing such data.

Other and further objects, features and advantages will become apparent as the description proceeds.

In carrying out the invention in accordance with a preferred form thereof, a plurality of analog addresses or input channels are provided with means for multiplexing to a single analog-to-digital converter. There is a data processor or a computer with means for producing a channel or address selector command which may be in accordance with a program set in the computer. Gating means are provided for controlling the analog inputs. For supplying biases or otherwise controlling the gating circuits a crystal diode matrix is provided; and a register of electronic switches or flip-flops responsive to the channel or address-selection command from the computer is provided for energizing the matrix in accordance with the state of each flip-flop for gating the selected input channel from one of the lines of the matrix.

In the arrangement described in this application there is no need for the employment of fixed periodic sampling or for storage of data in a memory device having variable access time. The only time delay involved is a constant value, corresponding to the switching time and the conversion time of the analog to digital converter, which can readily be made as small as $\frac{1}{10}$ millisecond and which can be anticipated if desired. For this reason, the input value that the computer receives has a constant time lag of only $\frac{1}{10}$ millisecond at most instead of a time lag which could vary from perhaps 1 to 50 milliseconds in the more common method. Consequently, one of the most difficult problems in digital control loops is overcome. Moreover, the arrangement described overcomes the problem of very large memory capacity required in cases where a large number of inputs are provided.

Figure 2:
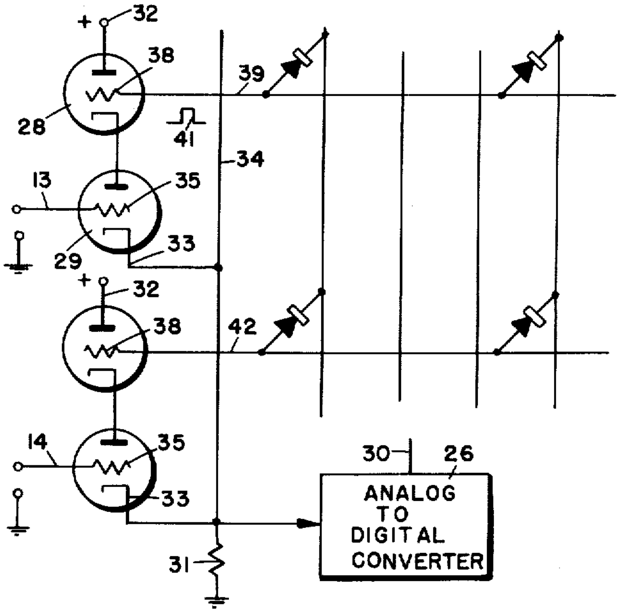
Figure 3:
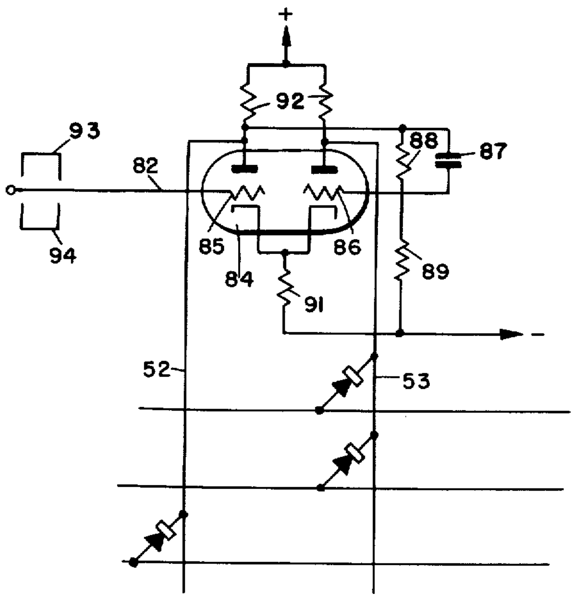

A better understanding of the invention will be afforded by the following detailed description considered in conjunction with the accompanying drawings in which FIG. 1 is a schematic circuit diagram of an embodiment of the invention;

FIG. 2 is a fragmentary diagram of the apparatus of FIG. 1 illustrating a gating valve and a fragment of the matrix; and FIG. 3 is a circuit diagram of one of the flip-flop units employed in the arrangement of FIG. 1.

Like reference characters are utilized throughout the drawing to designate like parts.

As illustrated in FIG. 1, there is a digital data processing device 11 for handling digital data, such as a digital computer, for example. The digital computer 11 includes means 12 for producing a channel or address selection command. The system is arranged for enabling the digital computer 11 to handle data selectively, including a plurality of variable quantities presented in analog form, such as continuously varying voltages, for example, through channels 13, 14, 15, 16, 17, 18, 19, 20, etc.

For accomplishing selection, a plurality of high speed switching devices, such as electronic switches or flip-flops 22, 23 and 24 are provided, together with a logical matrix 25 for selectively presenting data from the input channels or "addresses" 13–20, inclusive, through an analog-to-digital converter 26. The analog-to-digital converter may be of a conventional type, such as that now described, for example, in connection with FIG. 4 of Patent No. 2,715,678 to K. H. Barney, granted August 16, 1955.

The lines from the channels or addresses 13 to 20 include gating devices, such as a gating device 27 represented schematically in FIG. 1, the biases of which are controlled by the matrix 25 for selecting which input is to be applied to the converter 26.

Although the invention is not limited to a specific type of gating device, a suitable form of gating means is shown in greater detail in FIG. 2 comprising a pair of triode tubes 28 and 29, connected in series in a cathode-follower circuit. There is a cathode resistor 31 common to the gating devices 27. Each of the gating devices 27 is connected to a positive power supply terminal 32. Each cathode 33 of a cathode follower tube 29 is connected to a line 34 serving as an input line of the converter 26 and the common output line of the gating devices 27. As shown, the input channel such as the input channel 13, for example, is coupled to a control electrode or grid 35 of the cathode-follower 29. For gating the tube 28 its control grid 38 is connected to a gating line such as the line 39 on which a gating impulse represented schematically by a square wave 41 is applied from the logical matrix 25. There may be a synchronizing channel 30 between the converter 26 and the computer 11.

As shown in FIG. 1, the logical matrix 25 comprises a lattice of inter-connected lines. There is a plurality of gating lines, such as the lines 39, 42, 43, 44, 45, 46, 47 and 48 connected to a positive power supply terminal 49 through separate current-limiting resistors 51. There are also pairs of switching lines 52–57 from the flip-flops.

Each of the flip-flops 22, 23 and 24 has a pair of output lines 52 and 53, 54 and 55, 56 and 57, respectively, connected to the lines 39 and 42 to 48 through suitably arranged unilateral conducting devices, such as crystal diodes 58 to 81, inclusive. The crystal diodes are so arranged that, according to the condition of the flip-flops 22, 23 and 24, all but one of the gating lines 39 and 42 to 48 are shunted through the flip-flops 22, 23 and 24. The one line which is not shunted is that one which is selected as determined by the condition of the flip-flops. In consequence, the voltage remaining on all but the selected gating lead is low enough to maintain all gates, except the selected one in cut-off condition.

For example, if it is assumed that binary signals from the channel selector 12 of computer 11 are of such polarity as to cause the lines 52, 54 and 56 of the flip-flops 22, 23 and 24 to be at reduced potential with the lines 53, 55 and 57 at elevated potential, the crystal diodes 58, 59 and 60 have no effect since the cathode terminals thereof are at elevated potential and are non-conducting. Accordingly, the potential of the line 39 rises to the potential of the power supply terminal 49 causing a square wave gate 41 to be applied to the control electrode 38 of the tube 28 rendering it conducting and enabling a signal from the input line 13 to pass through the cathode follower tube 29 to the common output line 34 of the gates and into the converter 26. In each of the other gating lines 42 to 48, however, the gating line is at reduced potential so that the other gates in the group 27 are in a cut-off condition and no signals are transmitted from the input lines 14 to 20.

For example, in the case of the gating line 42, the flip-flop output line 56 is connected to a diode 63 and is at reduced potential. Current flows through one of the resistors 51 through the diode 63 and the line 56 through the flip-flop 24 preventing the line 42 from rising to a sufficiently high potential to gate the device 27 which controls the input line 14. Likewise, in the case of gating line 43, it is shunted through diode 65 and flip-flop 23. The same condition takes place in the remaining lines 44 to 48.

The switching devices 22, 23 and 24 may be of a suitable type embodying a circuit, whose state can be determined by the state of the channel selection command. The channel selection command can be introduced into the switching register 22, 23 and 24 in either parallel or serial form.

As illustrated in FIG. 3, representing parallel introduction, each electronic switch comprises a double-triode flip-flop tube 84 with one of the control lines 82 from the channel selector 12 coupled to the control grid 85 of one section of the tube 84, which is coupled in turn to the control grid 86 of the other triode section of the tube 84 through a condenser 87, and a voltage divider consisting of resistors 88 and 89. There is a cathode resistor 91 connected to a negative terminal and there are anode resistors 92 connected to a positive terminal. The channel selector 12 is arranged to apply either a positive pulse 93 or a negative pulse 94 to the grid 85 according to which section of the tube 84 is to conduct. The circuit has two stable conditions: one triode section conducting and the other cut-off; or vice versa.

When the channel selector 12 produces a command for taking a reading for use in the computer 11, the output of the selector 12 consists of a binary code, each bit of which is applied to the proper flip-flop in the register 22, 23 or 24.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, a digital computer having means for selecting addresses, a plurality of flip-flops whose state is determined by said address selector means, input terminals for a plurality of analog signal inputs, a plurality of analog gating devices each connected to one of said input terminals, each having a gating terminal and an output terminal, a logical matrix comprising a plurality of pairs of flip-flop conductors, each conductor connected to said flip-flops, a group of gating conductors each connected to one of said gating terminals and diode connections from the flip-flop conductors to the gating conductors, an analog-to-digital converter having an input terminal connected to all said gating device output terminals, and having output terminal means connected to the digital computer, whereby an analog signal selected from the input terminals according to the condition of the channel selecting means is converted to a digital signal and supplied to the digital computer.

2. In combination, a digital data handling device including address selector means, a plurality of two position switching means, controlled by the address selector means, a plurality of input terminals for analog signal inputs, a plurality of gating devices each connected to one of said input terminals and having a gating terminal and an output terminal, a logical matrix having a lattice of conductors and interconnecting diode devices for unidirectionally connecting each of the switching devices to one of the gating terminals, and an analog-to-digital converter having an input terminal connected to said gating-device output terminals, and an output terminal connected to the digital data handling device.

References Cited in the file of this patent

UNITED STATES PATENTS

| | | |
|---|---|---|
| 2,287,786 | Diamond et al. | June 30, 1942 |
| 2,570,716 | Rochester | Oct. 9, 1951 |
| 2,575,017 | Hunt | Nov. 13, 1951 |
| 2,590,950 | Eckert et al. | Apr. 1, 1952 |
| 2,686,299 | Eckert | Aug. 10, 1954 |
| 2,715,678 | Barney | Aug. 16, 1955 |
| 2,731,631 | Spaulding | Jan. 17, 1956 |
| 2,771,596 | Bellamy | Nov. 20, 1956 |
| 2,775,754 | Sink | Dec. 25, 1956 |
| 2,811,713 | Spencer | Oct. 29, 1957 |
| 2,858,524 | Ulrich | Oct. 28, 1958 |

OTHER REFERENCES

Rectifier Networks for Multiposition Switching, Proceedings of the I.R.E., February 1949, pp. 139–147.